No. 748,317. Patented December 29, 1903.

UNITED STATES PATENT OFFICE.

SCOTT A. SMITH, OF PROVIDENCE, RHODE ISLAND.

LUBRICANT AND PROCESS OF MAKING SAME.

SPECIFICATION forming part of Letters Patent No. 748,317, dated December 29, 1903.

Application filed May 28, 1903. Serial No. 159,121. (No specimens.)

*To all whom it may concern:*

Be it known that I, SCOTT A. SMITH, a citizen of the United States, residing at Providence, in the county of Providence and State of Rhode Island, have invented a new and useful Improvement in Lubricants and Processes of Manufacturing the Same, of which the following is a specification.

This invention has reference to an improvement in lubricating-oils; and it consists in the combination with oils of antimony trioxid and the method of combining the same, as will be more fully set forth hereinafter.

The invention consists more particularly in the treating of trioxid of antimony with lime to form calcium antimonite and incorporating the product with lubricating-oil, as will be set forth more fully hereinafter.

The object of the invention is to incorporate with lubricating-oil trioxid of antimony which acts to smoothen the metallic surfaces in contact by giving sufficient body to the lubricant.

Trioxid of antimony is of a very self-adherent nature and may be called "semipasty" in its character when considered as a powdered substance and cannot in itself be readily atomized.

After extended experiments and a series of practical tests I have succeeded in so preparing a calcium antimonite that it can be incorporated with lubricating-oils.

In carrying out my process I first heat the antimony trioxid over a sand-bath to about 200° Fahrenheit to drive out any moisture that may be held by the antimony, and then while warm I add about one-half ounce of sifted or bolted air-slaked lime to each pound of the antimony. I find that by the addition of the lime to the antimony I can then readily grind the same in a mill or mortar into an almost impalpable powder. The finely-divided antimony I then dust or blow in a cloud over the surface of the lubricating-oil to be treated, which is preferably stirred by any well-known mechanical means. After sufficient of the prepared antimony has been added to the oil, which is of a heavy gravity, I add a small quantity—about one to fifty—of lighter-gravity oil, which is thoroughly mixed with the the main lubricating-oil. The natural and actual tendency of the lighter-gravity oil I have found to rise in the mass, thus tending to oppose any real tendency of the antimony to become lumpy, and thereby separate from the lubricant.

Lubricating-oil treated as above described is permanently improved in its lubricating qualities, and a so-treated oil may be used for lubricating or mixed with other lubricating oils or grease with most beneficial results.

Having thus described my invention, I claim as new and desire to secure by Letters Patent—

1. The process herein described of treating lubricating-oils, the same consisting in mixing with trioxid of antimony air-slaked lime, then reducing to a powdered form, then adding the finely-divided compound to a heavy-gravity oil and finally adding a lighter-gravity oil, as and for the purpose described.

2. A lubricating-oil, consisting of a heavy-gravity oil and a lighter-gravity oil containing calcium antimonite formed and incorporated substantially as described.

In testimony whereof I have signed my name to this specification in the presence of two subscribing witnesses.

SCOTT A. SMITH.

Witnesses:
ADA E. HAGERTY,
J. A. MILLER, Jr.